(No Model.)
H. NADORFF.
BEER TAP.
No. 352,144. Patented Nov. 9, 1886.
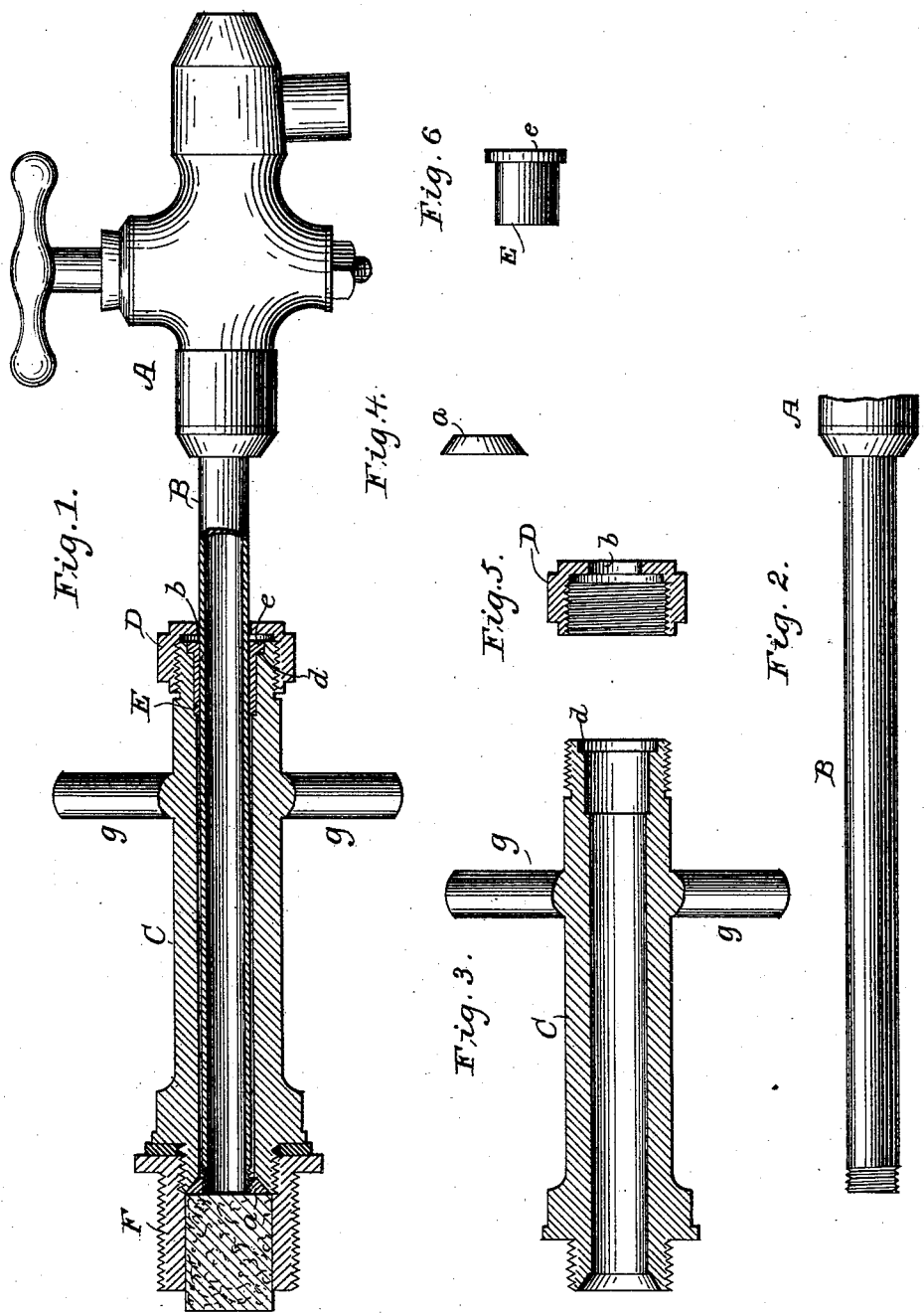
Witnesses
Jos. S. Latimer
Edna Sheehy
Inventor
Henry Nadorff
By his Attorney
Frank Sheehy

UNITED STATES PATENT OFFICE.

HENRY NADORFF, OF LOUISVILLE, KENTUCKY.

BEER-TAP.

SPECIFICATION forming part of Letters Patent No. 352,144, dated November 9, 1886.

Application filed April 13, 1886. Serial No. 198,681. (No model.)

*To all whom it may concern:*

Be it known that I, HENRY NADORFF, a citizen of the United States, residing at Louisville, in the county of Jefferson and State of Kentucky, have invented certain new and useful Improvements in Beer-Taps; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has relation to beer taps and bushings, and is designed as an improvement upon the devices shown and described in the Letters Patent granted to me September 15, 1885, No. 326,319.

The invention consists in the construction, novel arrangement, and adaptation of devices, as will be hereinafter more fully set forth and claimed.

In the accompanying drawings, Figure 1 is a longitudinal central section of my invention, showing the parts in the proper relative position. Fig. 2 is a view of the faucet proper with its long integral draft-tube. Fig. 3 is a view of the sleeve. Fig. 4 is a view of the draft-tube tip-ring. Fig. 5 is a view of the packing-gland, and Fig. 6 is a view of the sleeve-ring.

In carrying out my invention, I take a faucet, A, which may be of any ordinary or approved construction, and fix the inner end of the same by any suitable means to a long draft-tube, B, which will have communication with the bore of the said faucet. This tube is perfectly smooth and plain on its outer side to allow a free movement in the sleeve, and is provided at its free open end with threads for the reception of the internally-threaded ring a, which may be beveled, as shown, to engage a correspondingly-shaped bevel in the rear end of the sleeve C, whereby the latter may be prevented from leaving the draft-tube when placed in position thereon. This ring a also presents a broad surface or bearing for the tube in displacing the cork or plug from the bush of the vessel.

C indicates the sleeve for the draft-tube, which is plain on its inner side, and is provided at its rear internally-beveled end with external threads, to be screwed into threads in the forward inner portion of the bush, and adjacent to this threaded end is provided a wrench-seat, as shown. This sleeve is provided at its opposite end with external threads, to receive the internal threads of a packing-gland, D, which is also provided with a plain aperture, b, of less diameter, for the passage of the draft-tube. The forward end of this sleeve is also provided with an internal annular shoulder, d, to receive a reducer, E, having an external annular shoulder, e, to engage the said internal shoulder of the sleeve and true the longitudinal movements of the draft-tube therein. The sleeve may be also provided with levers g, for turning the same into the bush. By employing the short-flanged bore-reducer E a practically close-fitting joint can be readily made for the draft-tube B, without the objections to the boring out of the sleeve C.

F indicates the bush, which is provided with the usual external threads and face-flange. The bush is plain on its inner side, to receive a cork or plug, and in advance of this plain portion a series of threads to receive the rear threaded end of the sleeve.

To put the parts together the gland D should be first placed upon the draft-tube with the packing properly arranged therein. The forward end of the sleeve is then placed over the tube, with the reducer in position, and screwed into the threads of the gland. The tip ring or follower a is then screwed on the free end of the draft-tube, when the sleeve and the other parts will be prevented from leaving the said tube. In this position the device is ready to be applied to a cask, and a tap may be effected by first drawing the draft-tube forward, so as to bring the tip-ring into the beveled end of the sleeve, then screwing the rear externally-threaded end of the sleeve into the threads of the bush, and applying a mallet or the like to the forward end of the faucet, which will forcibly displace the plug from the bush in the cask.

It will be observed that I employ a long sleeve, C, adapted to be screwed tightly into the bung-bush F, and that I also employ a long draft-tube, which is permanently secured to the tail of the faucet A and open at both ends, so that an unobstructed flow of liquid through this tube is obtained when the faucet-plug is turned open. It will also be seen that I employ, in combination with the draft-tube and its sleeve, a short thimble or reducer, E, a screw-gland, and a packing therefor, whereby a gas-tight joint is effected and the draft-tube left free to be moved endwise.

It will furthermore be observed that I provide for readily removing the draft-tube from the sleeve C, so that the parts can be conveniently cleaned—a requirement which is frequently necessary to prevent contamination of beer.

I am aware that beer-taps have been provided with strainer-end draft-tubes secured to faucets and combined with sleeves or stuffing-boxes, screw-threaded to engage with a collar surrounding the bung-hole of a barrel, and provided with a packing-gland. I am also aware that screw-tapped bung-bushings have been provided with internal outwardly-closing valves secured to hollow laterally-perforated and screw-threaded stems adapted to be turned for opening or closing said valves by means of a screw-threaded key-stem formed on a faucet. I am also aware that in one instance a draft-tube open at both ends and provided on one end with an integral enlargement or bung-driver has been combined with a sleeve or stuffing-box having a conical threaded portion adapted to be screwed into the bung-hole of a barrel (not into a bushing) in front of the bung, the latter being then driven into the barrel by a blow on the faucet. These devices I broadly disclaim.

Having described this invention, what I claim is—

The improved beer-tap herein described, comprising the following elements: a sleeve having a wrench-seat and an externally-threaded extension internally beveled to form a seat and internally and externally threaded bung-bushing adapted for attachment to the said threaded reduced extension of the sleeve, a draft-tube open at its inner end, provided with a beveled follower and secured to a faucet at its outer end, said follower serving to expel the bung from its bushing and adapted to the seat in the inner end of the said sleeve, an annular flanged reducer fitted into the outer end of the latter, and a packing-gland screwed upon the outer end of this sleeve, all constructed and adapted to operate substantially in the manner and for the purposes specified.

In testimony whereof I affix my signature in presence of two witnesses.

HENRY NADORFF.

Witnesses:
ALBERT SCHOVILL, Jr.,
CHARLES NADORFF.